United States Patent [19]
Bailey et al.

[11] Patent Number: 4,765,277
[45] Date of Patent: Aug. 23, 1988

[54] TELESCOPIC POLE SYSTEM

[76] Inventors: Robert A. Bailey, 43 Plainsman Road, Streetsville, Ontario, L5N 1C4; Gordon H. Laurie, 33 River Road, Streetsville Mississauga, Ontario L5M 1R6, both of Canada

[21] Appl. No.: 22,184

[22] Filed: Mar. 5, 1987

[51] Int. Cl.$^4$ .................... A01K 39/00; A45F 3/44
[52] U.S. Cl. .................... 119/51 R; 248/156; 248/407; 119/23
[58] Field of Search .................... 119/23, 51 R, 52 R, 119/122; 248/156, 407

[56] References Cited

U.S. PATENT DOCUMENTS

| | | | |
|---|---|---|---|
| 2,560,109 | 7/1951 | Hines | 248/407 X |
| 2,691,958 | 10/1954 | Lage | 119/51 R |
| 2,891,508 | 6/1959 | Bower | 119/51 R |
| 3,066,769 | 12/1962 | Pasquale | 248/156 X |
| 3,301,217 | 1/1967 | Prowinsky | 119/51 R |
| 3,519,234 | 7/1970 | Matson | 248/156 |
| 4,030,451 | 6/1977 | Miller | 119/51 R |

FOREIGN PATENT DOCUMENTS 82557 10/1953 Norway .................... 119/122

Primary Examiner—Robert P. Swiatek
Attorney, Agent, or Firm—Arne I. Fors; Robert F. Delbridge

[57] ABSTRACT

A telescopic pole system for supporting a bird feeder, light system or the like comprises an elongated lower tubular pole component of circular cross-section, a ground sleeve for supporting the lower pole component, an upper tubular pole component of circular cross-section having an inner diameter greater than the outer diameter of the lower pole component, the lower pole component having an upper end of expanded cross-section for a snug, sliding fit within the upper pole component, and a collar secured to the lower end of the upper pole component having centering members for providing a snug, sliding fit over the lower pole component as the upper component is axially extended and retracted relative to the lower component, the collar having a pivotally-mounted retainer for locking the upper component on the lower component.

10 Claims, 3 Drawing Sheets

TELESCOPIC POLE SYSTEM

BACKGROUND OF THE INVENTION

This invention relates to a telescopic pole system and, more particularly, relates to a telescopic pole system particularly useful for a bird feeder, light standard and the like which can be easily raised and lowered for replenishing, servicing or replacement of the item supported.

U.S. Pat. No. 301,217 discloses a bird feeder mounted on a sleeve which is slidable on a post. The sleeve is secured in its upper position by means of a pin adapted to pass through a hole in the post. Another apparatus for raising and lowering a bird house is disclosed in U.S. Pat. No. 3,367,632 wherein a cable-pulley arrangement actuated by a crank raises and lowers the bird house on the post.

U.S. Pat. No. 3,696,792 discloses a bird house having a pivotal connection on a post to permit tilting of the bird house on its side to facilitate ease of cleaning of the bird house. In addition, a sleeve is telescopically mounted on the post to raise and lower the bird house, a cam type lock being mounted on the sleeve to engage the post for securing the bird house at a desired height. U.S. Pat. No. 3,814,059 discloses a hydraulically raisable and lowerable bird house on a telescopic pole structure.

The structures disclosed in the foregoing patents are fairly difficult to operate or are complex in construction and as a result expensive to manufacture.

STATEMENT OF INVENTION

The apparatus of the present invention permits facile extension or retraction of a simple and reliable telescopic pole system. In its broad aspect, the telescopic pole system comprises an elongated lower tubular pole component of circular cross-section of a predetermined outer diameter, means for supporting said lower pole component, an upper tubular pole component of circular cross-section having an inner diameter greater than the outer diameter of the lower pole component, said lower pole component having an upper end of expanded cross-section for a snug, sliding fit within the upper pole component, and a collar secured to the lower end of the upper pole component having centering means for providing a snug, sliding fit over the lower pole component as the upper component is axially extended and retracted relative to the lower component, said collar having locking means for locking the upper component on said lower component.

More particularly, the locking means comprise a plurality of axially-spaced holes formed along the lower component, and a retainer pivotally-mounted on the collar adapted to be inserted into one of said axially-spaced holes. The retainer preferably comprises a plunger for insertion into the hole, said plunger forming part of a pivotally-mounted eccentric lever adapted to bias the plunger by gravity into engagement with the said hole.

A guard may be provided to prevent small animals and rodents such as squirrels to climb the post. The guard comprises an inverted circular shield having a central opening for loosely receiving the post therein, annular support means mounted on the post to axially support the shield horizontally while permitting the shield to pivot about said support means, and a downwardly inclined peripheral flange having a width greater than the grip of a rodent. The annular support means preferably comprise at least two, preferably a pair, of axially arranged abutting O-rings frictionally engaging the post and having an outer diameter greater than the diameter of the central hole formed in the shield.

The means for supporting the telescopic post assembly, preferably in a vertical or near-vertical position, comprise a tubular ground sleeve of circular cross-section having an inner diameter greater than the outer diameter of the lower post component, said ground sleeve having a pointed, conical termination at its lower end for centering the lower end of the lower post component therein and a collar at its upper end, said collar having centering means for providing a snug, sliding fit of the lower post component therein, whereby the lower post component is centrally axially aligned with tte ground sleeve.

BRIEF DESCRIPTION OF THE DRAWING

The invention will now be described in detail with reference to the accompanying drawings, in which.

DESCRIPTION OF THE PREFERRED EMBODIMENTS

Figure 1:
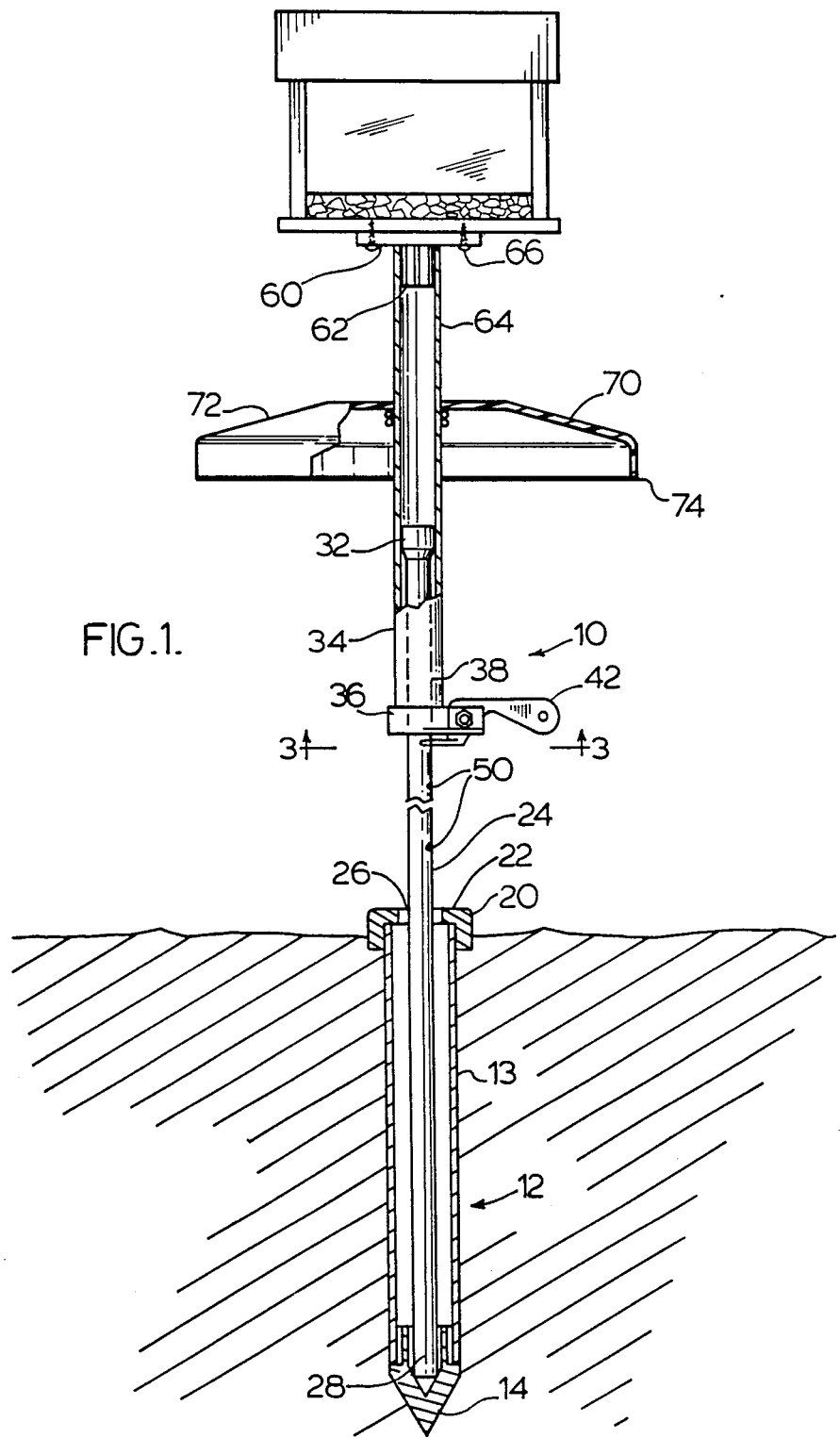
FIG. 1 is a side elevaton of a telescopic pole assembly of the present invention supporting a bird feeder.
Figure 2:
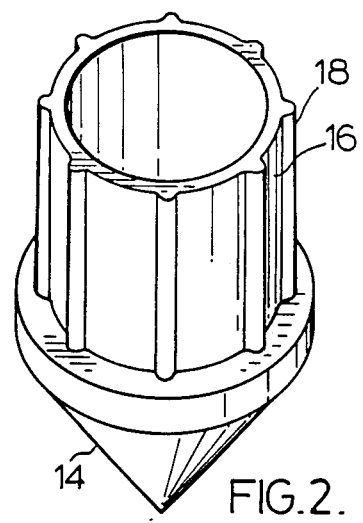
FIG. 2 is an enlarged view, partly cut away, of the nose cone of the sleeve for vertically supporting the telescopic post assembly.

FIG. 1 illustrates a telescopic pole assembly of the invention adapted to support a bird feeder. The telescopic pole assembly 10 comprises a ground sleeve 12 formed of tubular metal or rigid plastic pipe 13 having a bottom conical pcint 14. Conical point 14 (FIG. 2) is hollow and preferably has a short sidewall 16 with flutes 18 to receive the lower end of pipe 13 in tight fitting engagement.

The upper end of ground sleeve 12 has a collar 20 having a diameter sufficiently large to snugly fit over the upper end of pipe 13 with a shoulder 22 to abut the upper end of pipe 13. A central opening 26 in sleeve 12 has a diaxeter which permits sliding insertion of lower pole component 24 therein until the lower end 28 of pole 24 abuts the interior of cone 14. The inner conical shape of cone 14 centres the lower end 28 of pole 24 and in combination with the centering effect of circular hole 26 in collar 20, axially aligns post 24 with ground sleeve 12. Ground sleeve 12 preferably is vertically positioned but may be inclined from the vertical as much as 45°, if desired. Although a pole assembly of circular cross-section is described herein, it will be understood that the pole components can be multi-faceted, e.g. square, hexagonal or octagonal, in cross-section and the interior of cone 14 and collar 20 will be shaped accordingly to effectively centre the associated components.

The upper end of lower post component 24 is expanded at 32 for a snug, sliding fit within tubular upper post component 34. A locking collar 36 is mounted on the lowermost end 38 of upper post component 34 for locking component 34 at a desired height on the lower post component 24 by actuation of cam lever 42 pivotally mounted on collar 36.

Figure 3:
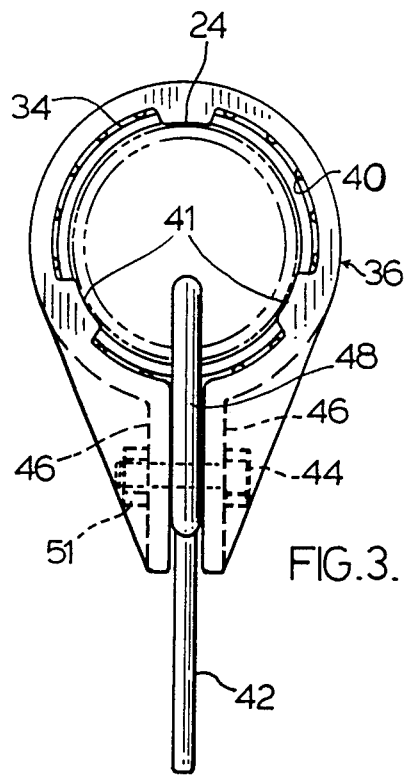
FIG. 3 is a section view taken along line 3—3 of FIG. 1 showing the locking collar.
Figure 4:
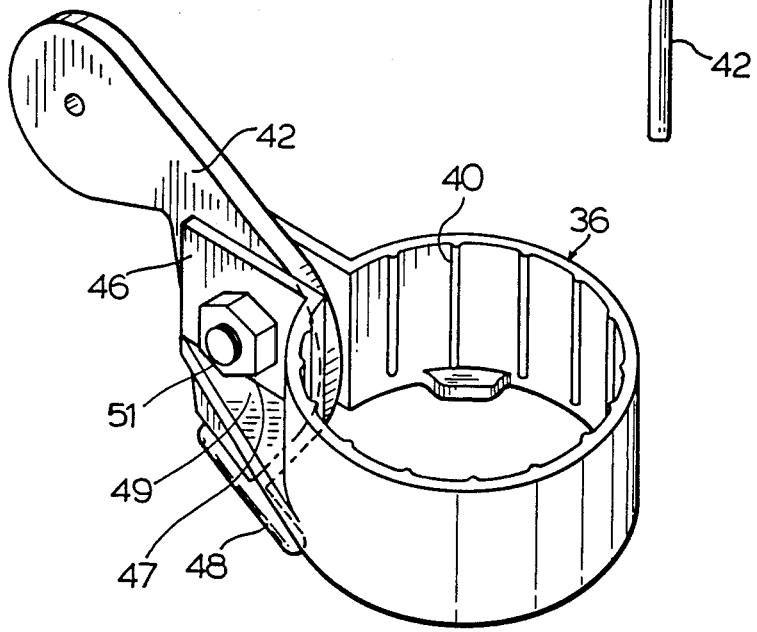
FIG. 4 is a perspective view of the locking collar shown in FIG. 3.

With reference now to FIGS. 3 and 4, collar 36 preferably has shallow flutes 40 formed on its inner wall for centering of collar 36 on post 34. Three equispaced lugs 41 project inwardly for abutment against and seating of the lower end of post component 34 thereon and for centering of post component 24 therein. A lever 42 pivotally mounted by bolt 44 on tabs 46 extending from collar 36 has a detent plunger 48 adapted to be inserted into one of a plurality of vertically aligned and axially separated holes 50 formed preferably at equal intervals along post 24 (FIG. 1). The hexagonal head of bolt 44 abuts the flat surface 47 of flange 49 to prevent rotation of bolt 44 and facilitate tightening of nut 51 to lock collar 36 on post component 34. Upper post component 34 thus is axially aligned with lower post component 24 during axial travel on lower post component 24 while being restrained from axial separation by abutment of expanded end 32 on collar lugs 41.

Figure 6:
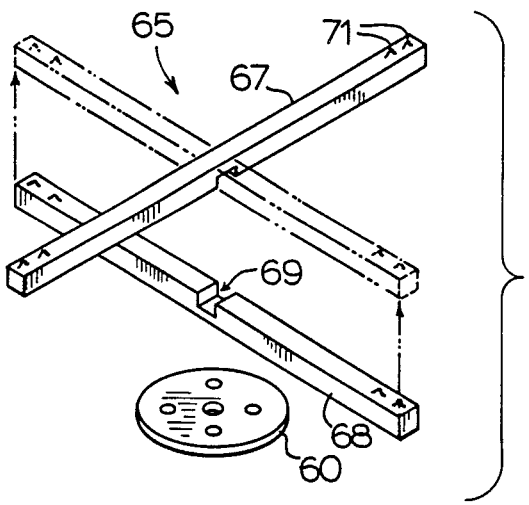
FIG. 6 is a perspective view, axially separated, of a cross-over support.

Referring now to FIG. 1, a bracket 60 having a downwardly extending central neck 62 is inserted into the upper end 64 of upper post component 34. Securing means such as screws 66 pass upwardly through holes formed in flange 60 to secure a bird feeder, as illustrated, bird house, X-support or light standard to the upper end of the telescopic post assembly. FIG. 6 illustrates a cross-over or X-support 65 comprising a pair of crossed members 67, 68 each having a central notch 69 formed therein for joining of members 67, 68 together at their centre points. Support 65 can be secured to bracket 60 by means of screws 66 (FIG. 1) and used to support hanging flower pots or the like, raised portions 71 serving to retain the bail of a pot or supporting strap thereon.

Figure 5:
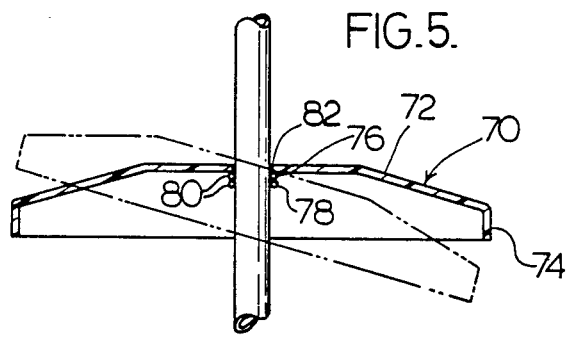
FIG. 5 is an enlarged elevation, partly in section, of the squirrel guard shown in FIG. 1.

With reference now to FIG. 5, a guard for preventing rodents such as squirrels to climb to the bird feeder is mounted on the upper post component. Guard 70 comprises an inverted circular shield preferably having an arcuate shape as indicated by numeral 72 with a downwardly extending peripheral flange 74 having a width greater than the toe span or finger span of a squirrel, for reasons which will become apparent as the description proceeds.

Guard 70 is mounted on the upper portion of upper post component 34 by means of a pair of abutting O-rings 76, 78 which have been slid individually up the outside of post component 34 to a desired height. The abutting rubber O-rings 76, 78 frictionally engage each other and are prevented from sliding or rolling down the post leg by their mutual engagement. O-rings 76, 78 preferably have at least one peripheral rib 80 whereby the ribs 80 of the abutting O-rings mesh and interlock to prevent rotation of the O-rings downwardly on post component 34.

Central opening 82 in shield 70 is sufficiently large to permit a loose fit of the said shield on the post. This loose fit permits shield 70 to tilt and rock on O-rings 76, 78, as depicted by the broken lines in FIG. 5, whereby a rodent such as a squirrel endeavouring to climb onto the shield will have difficulty to grip the edge of the shield because of downwardly extending flange 74 and in any event the tilting of the shield on the O-rings due to the weight of the squirrel usually causes the squirrel to loose its grip and to fall from the guard.

Figure 7:
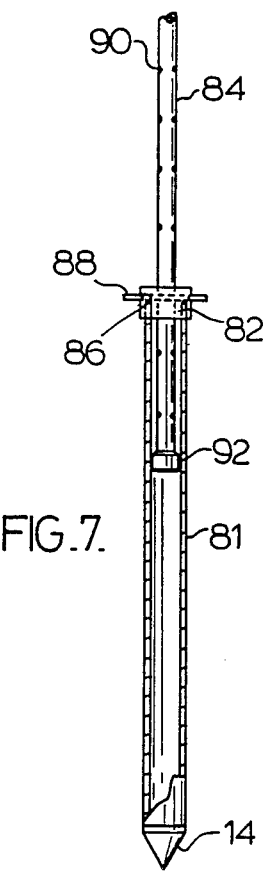
FIG. 7 is a side elevation of a further embodiment of elongated ground sleeve for additional pole height.

Turning now to FIG. 7, a ground sleeve 81 of extended length with conical point 14 is shown to permit additional pole height while allowing facile servicing ard replacement of accessories such as flag poles, security lights and purple martin bird houses which require substantial height above the ground surface. Collar 82, having a central opening to receive and centrally align a lower pole component 84, has a transverse hole 86 to receive locating pin 88 which is adapted to pass through one of a plurality of equispaced holes 90 which pass through pole component 84. Pole component 84 thus can be lowered into ground sleeve 81 or raised with an upper pole component 34 thereon (FIG. 1) and locked at a desired height by locating pin 88. Ground sleeve 81 in this embodiment preferably is seated in concrete.

Lower pole component 84 is axially aligned with ground sleeve 81 by collar 82 at the upper end of ground sleeve 81 and by expanded lower end 92 for a snug, sliding fit within (round sleeve 81.

Figure 8:
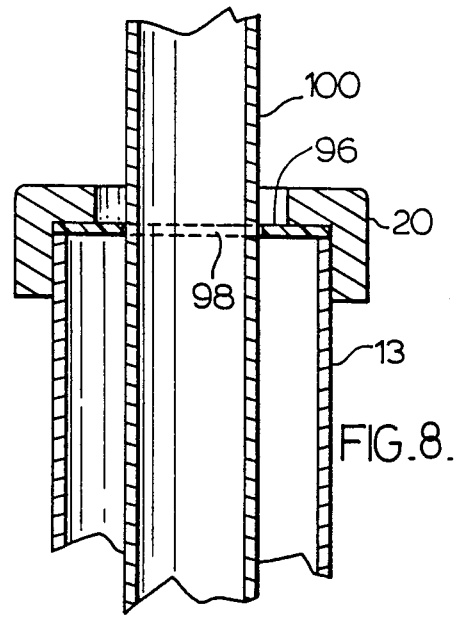
FIG. 8 is a vertical section of an embodiment of collar on a ground sleeve.

FIG. 8 illustrates an adaptor for a ground sleeve collar 20 or 82 to accommodate and permit centering of prsts of various diameters. A flat disc 96 having an outer diameter slightly less than the inner diameter of for example collar 20 but greater than the inner diameter of ground sleeve 13 is seated on the top end of ground sleeve 13 within collar 20. Disc 96 can have any desired diameter or shape of central hole 98 to receive a post component 100.

The telescopic pole system of the present invention provides a number of important advantages.

The components of the telescopic port assembly can be conveniently formed from plastics or from metals such as zinc or aluminum-magnesium alloys. The telescopic components are simple and substantially free from jamming, such as by ice during the winter months, permitting raising and lowering even under adverse weather conditions. The components are self-centering and can be readily locked at a desired height. A power supply such as an electrical cord can be passed through the assembly to service a floodlight or like electrical device at the top of the post assembly.

It will be understood, of course, that modifications can be made in the embodiments of the invention illustrated and described herein without departing from the scope and purview of the invention as defined in the appended claims.

We claim:

1. A telescopic pole system comprising, in combination, an elongated lower tubular pole component of a predetermined outer diameter, a tubular ground sleeve of circular cross-section having an inner diameter greater than the outer diameter of the lower tubular pole component, said ground sleeve having a pointed, conical termination at its lower end for centering the lower end of the lower pole component therein and a collar at its upper end, a flat disc having an outer diameter slightly less than the inner diameter of the ground sleeve collar but greater than the ground sleeve inner diameter whereby said disc will seat within the said collar on the ground sleeve, said disc having a central opening of a desired diameter and shape to receive the lower pole component in a sliding fit therein for centering said lower pole component with the upper end of the ground sleeve, an upper tubular pole component having an inner diameter greater than the outer diameter of the lower pole component, said lower pole component having an upper end of expanded cross-section for a snug, sliding fit within the upper pole component, and a collar secured to the lower end of the upper pole component having centering means for providing a snug, sliding fit over the lower pole component as the upper component is axially extended and retracted relative to the lower component, said upper pole component collar having locking means for locking the upper component on said lower component.

2. A telescopic pole system as claimed in claim 1 in which the locking means comprise a plurality of axially-spaced holes formed along the lower pole component, and a retainer pivotally-mounted on the upper pole component collar adapted to be inserted into one of said axially-spaced holes.

3. A telescopic pole assembly as claimed in claim 2 in which said retainer comprises a plunger for insertion into a hole, said plunger forming part of a pivotally-mounted eccentric lever adapted to bias the plunger by gravity into engagement with the said hole.

4. A telescopic pole system as claimed in claim 3 in which said lower and upper pole components are circular or multi-faceted in cross-section.

5. A telescopic pole assembly as claimed in claim 1 which additionally comprises a rodent guard, said guard comprising an inverted circular shield having a central opening for loosely receiving the upper pole component therein, a downwardly inclined peripheral flange having a width greater than the grip of a rodent, and annular support means mounted on the upper pole component to axially support the shield substantially horizontally while permitting the shield to pivot about said support means.

6. A telescopic pole assembly as claimed in claim 5 wherein the annular support means comprises at least two axially arranged abutting O-rings frictionally engaging the upper pole component and having an outer diameter greater than the diameter of the central hole formed in the shield.

7. A telescopic pole assembly as claimed in claim 6 wherein each of said abutting O-rings has at least one peripheral rib whereby said ribs frictionally engage each other.

8. A telescopic post assembly as claimed in claim 1 including a bracket having a downwardly extending central neck inserted in the upper end of said upper pole component, and an X-support mounted on said bracket, said X-support having outwardly diverging arms with means formed thereon to locate and support hanging pots thereon.

9. A telescopic pole assembly as claimed in claim 1 wherein locking means are provided for locking the lower pole component within the ground sleeve, said lower pole component having a lower end of expanded cross-section for a snug, sliding fit within the ground sleeve.

10. A telescopic post assembly as claimed in claim 9 wherein said locking means for the lower pole component comprise a locating pin adapted to pass through said ground sleeve collar and through one of a plurality of axially spaced holes formed along the lower pole component.

* * * * *